R. WILLIAMS
METHOD OF EFFECTING CATALYTIC REACTIONS
Dec. 29, 1931. Re. 18,302
Original Filed April 20, 1927
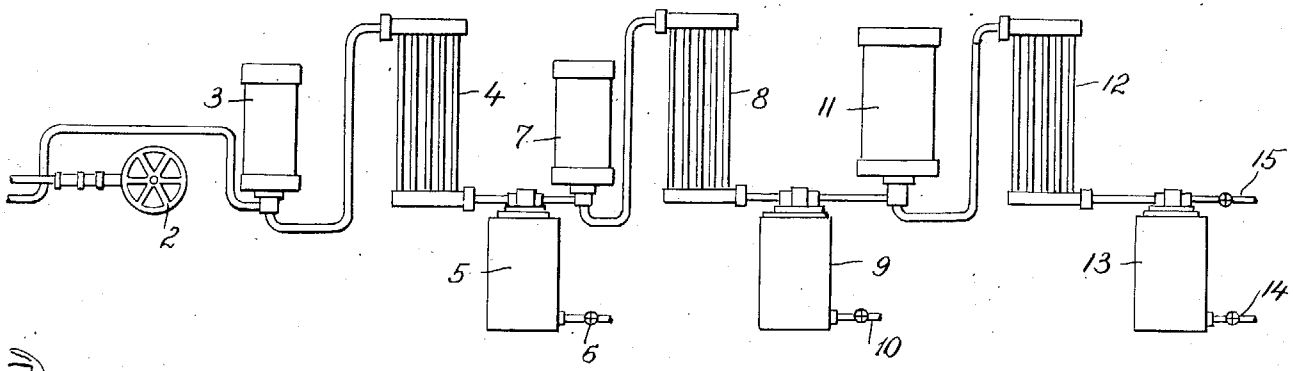
INVENTOR
Roger Williams
BY
Pennie Davis Marvin & Edmonds
ATTORNEYS Reissued Dec. 29, 1931

Re. 18,302

UNITED STATES PATENT OFFICE

ROGER WILLIAMS, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

METHOD OF EFFECTING CATALYTIC REACTIONS

Original No. 1,820,417, dated August 25, 1931, Serial No. 185,339, filed April 20, 1927. Application for reissue filed October 5, 1931. Serial No. 567,082.

This invention relates to a method of effecting catalytic reactions with gaseous mixtures containing hydrogen as described in the application of Roger Williams, Serial No. 58,260, filed September 24, 1925, of which this application is a continuation in part.

In the numerous commercial chemical processes in which hydrogen is employed, as for example in the synthesis of ammonia, the question of a source of cheap hydrogen is of great economic importance. One method of obtaining hydrogen cheaply is by the partial liquefaction of gaseous fuels rich in hydrogen, such as water gas, coke-oven gas, or the like, whereby the more readily condensable constituents of these gases, such as carbon monoxide, methane, etc., are separated from the hydrogen by liquefaction. Hydrogen can be obtained also by removing carbon dioxide from mixtures of hydrogen and carbon dioxide, produced by the catalytic conversion of steam and carbon monoxide, or steam and hydrocarbons:

$$CO+H_2O=CO_2+H_2$$
$$CH_4+2H_2O=CO_2+4H_2$$

Hydrogen from all of these sources invariably contains residual carbon monoxide, which is in general highly objectionable in catalytic processes, since it acts as a poison for many catalysts. This is true, for example, of the synthetic ammonia process where the presence of as little as 0.01% carbon monoxide in the nitrogen-hydrogen mixture may seriously affect the activity of the catalyst under some operating conditions.

It has hitherto been proposed to separate the carbon monoxide with which the hydrogen is contaminated by passage of the gases over heated soda lime or calcium carbide, or under pressure through ammoniacal solutions of cuprous salts, or hot solutions of caustic soda. The cost of such methods of carbon monoxide removal is prohibitive, however, when hydrogen-containing gases of moderately high carbon monoxide are to be purified, principally because of the large consumption of materials involved. This fact is of particular importance since in the manufacture of hydrogen by the partial liquefaction of water gas, or the like, the lower the carbon monoxide content of the hydrogen the greater the working pressure and, therefore, the higher the cost; similarly the cost of manufacture of hydrogen by the steam conversion of carbon monoxide or hydrocarbons is raised if the carbon monoxide content of the hydrogen is lowered, since thereby the catalyst requirement and steam consumption are more than proportionately increased.

From the standpoint of cost of materials, a catalytic process for the purification of hydrogen containing relatively small amounts of carbon monoxide would be highly desirable. One process of this type has been suggested, namely the catalytic methanation of carbon monoxide, whereby the carbon monoxide in the gaseous mixture, on being passed over a suitable catalyst under proper conditions of temperature, reacts with some of the hydrogen to form methane and water, in accordance with the reaction:

$$CO+3H_2=CH_4+H_2O$$

The water is removed by condensation or absorption and the methane passes on with the hydrogen to the reaction chamber in which the latter is to be consumed.

While such a process of removal of carbon monoxide may be carried out effectively, it has several inherent disadvantages. For example, one of the products of the purification operation, namely, methane, remains in the hydrogen, there being no convenient method known for removing it therefrom. This methane occupies the same volume as the carbon monoxide from which it is produced, and the consequent dilution of the hydrogen results in a decrease in the efficiency of the reaction in which the hydrogen is subsequently employed. Moreover, the presence of methane in hydrogen is objectionable in certain catalytic processes, such as ammonia synthesis, for the further reason that it may undergo partial decomposition in the reaction chamber and may thereby carburize, and decrease the activity of, the catalyst. Finally, no less than three volumes of hydrogen are consumed per volume of carbon monoxide eliminated and this consumption of hydrogen represents an economic loss in the process.

I have discovered that catalytic reactions with gaseous mixtures containing hydrogen contaminated with carbon monoxide can be improved by passing the gaseous mixture preliminarily and under pressure over a catalyst capable of causing carbon monoxide to react with a portion of the hydrogen to form oxygenated hydrocarbons. That is to say, I have found that by passing the gaseous mixtures over a catalyst of this type, it is possible not only to greatly reduce the concentration of carbon monoxide but even to practically completely eliminate it. Moreover, as will be more specifically hereinafter pointed out, the improved results manifested as a higher yield of product in the main reaction, notably in the synthesis of ammonia, are of a higher order than might be anticipated simply on the basis of the degree of carbon monoxide elimination effected.

That this method for the elimination of oxide of carbon is possible is the more surprising since it might be expected that under pressure and in the presence of the great excess of hydrogen always existing when hydrogen containing relatively small amounts of carbon monoxide is to be purified, the formation of methane would occur to the exclusion of the production of oxygenated hydrocarbons. For of the two types of reaction:

$$CO+3H_2=CH_4+H_2O$$
$$CO+2H_2=CH_3OH$$

the former goes to completion easily even at low temperatures and at atmospheric pressure, while the latter occurs to a measurable extent only under pressure; and it would be anticipated from theoretical considerations that the former would be the more favored by an excess of hydrogen.

In carrying out the invention, the gaseous mixture containing hydrogen contaminated with more or less carbon monoxide is conducted at a suitable pressure and temperature over a selected catalyst which is adapted to convert the carbon monoxide in the presence of hydrogen into an oxygenated hydrocarbon. Other circumstances permitting it, the pressure employed should preferably be that at which the subsequent reaction is carried out. By sufficient cooling of the gaseous products of the purification operation, preferably still under the initial pressure, the oxygenated hydrocarbons can be condensed and drawn off in the liquid state. The hydrogen-containing gases can be passed then, preferably still under substantially the initial pressure, and after further purification, if necessary, to the apparatus in which the final reaction is effected.

Copper, manganese and magnesium; zinc and chromium; zinc and copper; chromium and copper; and zinc are mentioned by way of examples of the catalytic substances suitable for the elimination of the carbon monoxide. The catalysts can be prepared and introduced advantageously as oxides or mixtures thereof. In the case of the use of mixtures, one of the oxides seems to serve as a promoter of the catalytic action of the other.

The reaction between hydrogen and carbon monoxide under the specified conditions produces oxygenated hydrocarbons, notably methanol, usually with some proportion of methane. The extent to which the carbon monoxide is converted on the one hand to oxygenated hydrocarbons, and on the other hand to methane, will depend upon the conditions of operation, but more especially upon the nature of the catalyst. Under certain conditions, it may be considered advisable to use a catalyst which will remove most, but not all, of the carbon monoxide and that substantially all in the form of oxygenated hydrocarbons. The balance of the carbon monoxide can be eliminated then by passing the gases, still under pressure, over a second catalyst, which will convert the carbon monoxide to methane, or it may be preferred to remove the remaining carbon monoxide by passing the gases, still under pressure, through one of the ordinary absorbents for carbon monoxide previously mentioned. Under other circumstances, it may be desirable to utilize a catalyst that will completely convert the carbon monoxide even though a portion of the conversion products be methane.

By employing the method herein described for the removal of carbon monoxide from mixtures thereof with hydrogen a distinct improvement is effected in the reaction in which the hydrogen is employed. For example, I have repeatedly observed the comparative results obtained in ammonia synthesis in two ammonia synthesis units operating on the same gas, the carbon monoxide being removed in the first case by what may be considered the best and most generally used method of the prior art and in the second case by the method herein described. In both instances a nitrogen-hydrogen mixture obtained from water-gas was employed, carbon dioxide and hydrogen sulphide having been removed by alkali scrubbing and the carbon monoxide reduced to four per cent. by partial liquefaction. In the first case, the elimination of the four per cent. of carbon monoxide was effected by passage of the gaseous mixture through a heated methanation catalyst, having iron as a base, and the purified gases, after condensation of water, were led to a synthesis apparatus containing a heated ammonia synthesis catalyst. In the second case, the nitrogen-hydrogen mixture containing four per cent. carbon monoxide was submitted to the action of a heated copper-manganese-magnesia catalyst, whereby carbon monoxide was removed in the form of oxygenated hydrocarbons, which were condensed by cooling the gases. To ensure the elimination of the last traces of carbon monoxide the gaseous mixture was then passed over a heated methanation catalyst, the small amount of water formed was condensed, and then the gases were passed through the ammonia synthesis catalyst. The methanation and ammonia catalysts were identical and, except for the differences already noted, the apparatus and conditions of operation were the same in both cases. The hourly yield of ammonia obtained by the process herein described was more than twelve per cent. higher than that obtained by the method of the prior art. Such an increase in the yield could not have been predicted upon the basis of any data known or published prior to the invention and, in fact, the reasons for the increased yield cannot at the moment be explained with certainty.

As an example of the oxygenated hydrocarbons produced by the process, methyl alcohol may be formed according to the chemical reaction:

$$CO+2H_2=CH_3OH.$$

The removal of carbon monoxide by means of a reaction such as the foregoing involves a consumption of hydrogen smaller than that required in the conversion of carbon monoxide to methane or other hydrocarbons. Moreover, the hydrogen consumed is recovered in the valuable oxygenated hydrocarbon product. There is the additional advantage that the oxygenated hydrocarbons can be removed easily to a practically complete extent from the balance of the gaseous mixture by simple condensation, the only gaseous impurity remaining in and diluting the gases being such methane or other hydrocarbon as may be produced. This will depend in amount upon the conditions of operation and the catalyst used.

Another benefit derived from my process as a result of the nature of its products is that by condensation of the oxygenated hydrocarbons, for example, methyl alcohol, the removal of other undesirable impurities, such as water, sulfur compounds and possibly unconverted carbon monoxide and oxygen, if present, is facilitated by the washing action of the condensed oxygenated hydrocarbons upon the gases. This action is particularly advantageous if any methane be present, since more than fifty volumes of methane dissolve in one hundred volumes of methyl alcohol at atmospheric pressure and considerably more at higher pressures. The foregoing impurities may be present in such small amounts as not to be detectable by ordinary analytical methods nor to affect the quality of the oxygenated hydrocarbons formed, and yet, if unremoved, they may exert a deleterious influence upon the catalyst over which the gases are subsequently passed, as in the synthesis of ammonia, for example.

The oxygenated hydrocarbons produced by the process are of great commercial value. I have found that by removing, as described, the proportion of four per cent. carbon monoxide ordinarily present in the nitrogen-hydrogen mixture intended for ammonia synthesis, sufficient oxygenated hydrocarbons, such as methyl alcohol, for example, may be produced to reduce materially the cost of manufacturing synthetic ammonia. In none of the hitherto known processes for the removal of carbon monoxide from hydrogen or hydrogen-containing gases, is the recovery of such valuable by-products possible.

An apparatus adapted for the practice of the invention is illustrated diagrammatically in the accompanying drawing.

Referring to the drawing, 2 indicates a compressor which is adapted to raise the pressure of the gaseous mixture to the desired point and to deliver it to a catalyst chamber 3 in which the heated catalyst for converting carbon monoxide and hydrogen into oxygenated hydrocarbons is disposed. From this chamber the gases are delivered to a condenser 4 wherein they are cooled to condense the oxygenated hydrocarbons which are separated from the gases in a receiver 5. The oxygenated hydrocarbon product may be withdrawn through an outlet 6. From the receiver 5 the gases may pass into a second catalyst chamber 7 wherein they are subjected, for example, to a heated methanation catalyst to convert any remaining traces of carbon monoxide into methane and water. The water is separated in a condenser 8 and collected in a receiver 9 from which it may be withdrawn through an outlet 10. The gases thus purified may pass then to the catalyst chamber 11 wherein the principal reaction is effected and in which a heated catalyst, for example, an ammonia synthesis catalyst, is disposed. The reaction between the nitrogen and hydrogen in the gaseous mixture produces ammonia which is condensed in the condenser 12 and recovered from the gases in a receiver 13. The ammonia may be withdrawn through an outlet 14 while the gases escaping through the pipe 15 may be delivered to another catalyst chamber for further reaction or discharged to the atmosphere.

The manner of carrying out my invention will be understood from the following examples in which its application to the synthesis of ammonia and to the hydrogenation of oils is described.

*Example 1.*—A mixture of nitrogen and hydrogen, free from permanent catalyst poisons such as sulfur compounds, in the proportion by volume of 1 to 3, and containing approximately two per cent. by volume of carbon monoxide, is compressed to about 900 atmospheres. The compressed gases pass over the catalyst at a temperature of 350°–400° C., and at a space velocity of 10,000. (The space velocity is the hourly gas flow, measured at atmospheric pressure and temperature, per unit volume of catalyst.)

A copper-manganese-magnesia catalyst may be employed. This is prepared by intimately mixing 77 moles of pure cupric oxide, 15 moles of pure manganese dioxide and 8 moles of pure magnesium oxide. The mixture is fused under an electric arc and the fused mass is cooled, crushed and screened to suitable size, and finally reduced with pure hydrogen at ordinary pressure and 250°–350° C.

Other catalyst that may be used for the purpose can be prepared as follows:

Dissolve 2268 grams of pure zinc nitrate in 2 liters of water, and add to the solution, while stirring, 1150 grams of pure ammonium chromate. Filter the precipitate, wash, dry and finally heat it to 400° C. Allow the material to cool, crush and screen it to suitable size.

A zinc oxide catalyst can be prepared by precipitating zinc carbonate from a fifteen per cent. (by weight) solution of zinc nitrate by addition of ammonium carbonate solution. The precipitate is filtered, dried at 120° C. and then converted to the oxide by ignition in a muffle furnace at 400° C. for twelve hours. Finally, it is ground and formed into briquettes of 8 to 14 mesh size.

A catalyst consisting of zinc oxide together with chromium oxide can be prepared by adding a slight excess of ammonium hydroxide to a cold solution of 158 grams of chromium nitrate and 200 grams of zinc nitrate in two liters of water. Wash the precipitate thoroughly by decantation, filter, dry at 120° C., crush and form into briquettes of about 8 to 14 mesh size.

A copper-chromium catalyst is prepared by adding a solution of 48 grams of potassium dichromate in 375 cc. of water to a solution of 59 grams of copper nitrate in 270 cc. of water. Heat the mixture to boiling and filter and wash the precipitate with hot water until free from alkali. Dry the material at 120° C. for fourteen hours and crush and form it into briquettes of about 8 to 14 mesh size.

To prepare a copper-zinc catalyst, mix a solution of 150 grams of copper nitrate in one liter of water with a solution of 120 grams of zinc nitrate in one liter of water. To the cold mixed solutions add ammonium hydroxide until precipitation is complete. Wash the precipitate thoroughly by decantation, filter, dry at 120° C. for fourteen hours, grind the material and form it into briquettes of about 8 to 14 mesh size.

All the catalysts should before use be reduced, preferably by treatment with pure hydrogen at atmospheric pressure and 150° to 350° C.

From the catalytic apparatus 3, the gases, still under pressure, pass through the tubes of the condensers 4, over which cold water is running, and thence to the receiver 5. Here oxygenated hydrocarbons, principally methanol, produced in 3 and condensed in 4, together with any impurities they may wash out of the gases, are separated from the gases and may be drawn off through the outlet 6. The gases then flow to second catalytic apparatus 7, containing a heated methanation catalyst. This catalyst has the same composition as the ammonia synthesis catalyst hereinafter described, and may advantageously be spent ammonia catalyst. The methanation catalyst is maintained at a temperature of about 350° C. While passing through the apparatus 7 the last traces of carbon monoxide are converted to methane and water, the latter being condensed in the condenser 8 and collected in the receiver 9. The purified gases leaving the receiver 9 go on to the ammonia converter 11, wherein they are brought into contact with a heated ammonia synthesis catalyst, whose temperature is maintained at about 550° C. The catalyst is prepared by fusing pure $Fe_3O_4$ with 2 per cent of its weight of pure $Al_2O_3$, cooling, crushing, screening and reducing with pure hydrogen. The ammonia formed in 11 is liquefied by passage of the gases through the condenser 12, over which cold water is running. The liquefied ammonia is collected in 13 and the residual gases may be recirculated through the apparatus 11, 12 and 13, by a circulatory pump (not shown), or passed through one or more additional synthesis units; or, if the conversion attained is already satisfactory, they may be exhausted into the atmosphere.

Although definite space velocities have been specified in the foregoing examples, the space velocity may be varied somewhat to suit the circumstances. The optimum space velocity under given conditions will depend upon the catalyst employed, the nature of the oxygenated hydrocarbons desired and the extent to which the carbon monoxide is to be eliminated.

Oily products and alcohols of higher molecular weight than methyl alcohol may be produced if the space velocity is decreased; if alkali oxides are added to the catalyst; and if the temperature of the catalyst used in treating the reacting gases is increased.

The advantages resulting from the invention can be attained by treating gaseous mixtures containing upward to 10 per cent. and more of carbon monoxide with the consequent production and recovery of oxygenated hydrocarbons and the preparation of hydrogen free from carbon monoxide for subsequent use in catalytic reactions.

In the foregoing description the possible operation of the process at relatively high pressures, for example, 900 atmospheres, sometimes called "hyperpressures", and also at lower pressures, such as 150 atmospheres for instance, is indicated. The pressure employed in converting the carbon monoxide will depend to a large extent upon the pressure at which the final reaction is effected because it is desirable to maintain a substantially uniform pressure throughout the system. It should be noted, however, that, due to the effect of pressure on the reaction equilibrium, to obtain at relatively low pressures with a given catalyst a given degree of carbon monoxide elimination, it is necessary to employ a lower space velocity than might be used at higher pressures. For the same reason it may be advantageous to carry out the carbon monoxide removal in a stepwise fashion; that is, a portion of the carbon monoxide may be converted to oxygenated hydrocarbons by passage over a catalyst, the oxygenated hydrocarbons condensed, further carbon monoxide converted in the same way and so on, until the carbon monoxide concentration is reduced to the value desired.

Various changes can be made in the details of operation and in the apparatus employed without departing from the invention or sacrificing the advantages described.

I claim:

1. The method of improving the production of ammonia by catalytic reaction with gaseous mixtures containing hydrogen, which comprises subjecting the gaseous mixture including hydrogen and nitrogen, in proportions to combine to form ammonia, and carbon monoxide preliminarily and at reacting temperature to the action of a catalyst capable of converting carbon monoxide in the presence of hydrogen into oxygenated hydrocarbons, condensing and removing the oxygenated hydrocarbons from the gaseous mixture and subjecting the gaseous mixture at reacting temperature to the action of an ammonia synthesis catalyst.

2. The method of improving the production of ammonia by catalytic reaction with gaseous mixtures containing hydrogen, which comprises subjecting the gaseous mixture including hydrogen and nitrogen, in proportions to combine to form ammonia, and carbon monoxide preliminarily and at reacting temperature to the action of a catalyst capable of converting carbon monoxide in the presence of hydrogen into oxygenated hydrocarbons, condensing and removing the oxygenated hydrocarbons from the gaseous mixture, eliminating additional combined oxygen from the gaseous mixture, and subjecting the gaseous mixture at reacting temperature to the action of an ammonia synthesis catalyst.

3. The method of improving the production of ammonia by catalytic reaction with gaseous mixtures containing hydrogen, which comprises subjecting the gaseous mixture including hydrogen and nitrogen, in proportions to combine to form ammonia, and carbon monoxide preliminarily and at reacting temperature to the action of a catalyst capable of converting carbon monoxide in the presence of hydrogen into oxygenated hydrocarbons, condensing and removing the oxygenated hydrocarbons from the gaseous mixture, subjecting the gaseous mixture at reacting temperature to a methanation catalyst, condensing the water formed, and subjecting the gaseous mixture at reacting temperature to the action of an ammonia synthesis catalyst.

4. The method of improving the production of ammonia by catalytic reaction with gaseous mixtures containing hydrogen, which comprises subjecting the gaseous mixture including hydrogen and nitrogen, in proportions to combine to form ammonia, and upward to ten per cent. of carbon monoxide preliminarily and at reacting temperature to the action of a catalyst capable of converting carbon monoxide in the presence of hydrogen into oxygenated hydrocarbons, condensing and removing the oxygenated hydrocarbons from the gaseous mixture, and subjecting the gaseous mixture at reacting temperature to the action of an ammonia synthesis catalyst.

5. The method of improving the production of ammonia by catalytic reaction with gaseous mixtures containing hydrogen, which comprises subjecting the gaseous mixture including hydrogen and nitrogen, in proportions to combine to form ammonia, and carbon monoxide preliminarily and at reacting temperature to the action of a catalyst, including copper, managanese and magnesium, and capable of converting carbon monoxide in the presence of hydrogen into oxygenated hydrocarbons, condensing and removing the oxygenated hydrocarbons from the gaseous mixture, and subjecting the gaseous mixture at reacting temperature to the action of an ammonia synthesis catalyst.

6. The method of improving the production of ammonia by catalytic reaction with gaseous mixtures containing hydrogen, which comprises subjecting the gaseous mixture including hydrogen and nitrogen, in proportions to combine to form ammonia, and carbon monoxide preliminarily, at reacting temperature and under pressure to the action of a catalyst capable of converting carbon monoxide in the presence of hydrogen into oxygenated hydrocarbons, condensing and removing the oxygenated hydrocarbons from the gaseous mixture under substantially the same pressure, and subjecting the gaseous mixture reacting temperature to the action of an ammonia synthesis catalyst.

7. The method of improving the production of ammonia by catalytic reaction with gaseous mixtures containing hydrogen and nitrogen, in proportions to combine to form ammonia, which comprises subjecting the gaseous mixture including hydrogen and carbon monoxide preliminarily and at reacting temperature to the action of a copper-containing catalyst and capable of converting carbon monoxide in the presence of hydrogen into oxygenated hydrocarbons, condensing and removing the oxygenated hydrocarbons from the gaseous mixture, and subjecting the gaseous mixture at reacting temperature to the action of an ammonia synthesis catalyst.

8. The method of improving catalytic reactions with gaseous mixtures containing hydrogen which comprises subjecting a gaseous mixture including hydrogen and nitrogen, in proportion to combine to form ammonia, and carbon monoxide preliminarily and at reacting temperature and under pressure of from 150 to 900 atmospheres to the action of a catalyst capable of converting the oxide of carbon in the presence of hydrogen into oxygenated hydrocarbons, condensing and removing the oxygenated hydrocarbons from the gaseous mixture under substantially the same pressure, and subjecting the gaseous mixture at reacting temperature to the action of an ammonia synthesis catalyst which is capable of effecting the synthesis of the hydrogen.

In testimony whereof I hereto affix my signature.

ROGER WILLIAMS.